United States Patent Office 2,772,313
Patented Nov. 27, 1956

2,772,313

REDUCTION OF META CHLORO NITROBENZENE TO META CHLORO ANILINE

Fred C. Trager, Akron, Ohio, assignor to Columbia-Southern Chemical Corporation, Allegheny County, Pa., a corporation of Delaware No Drawing. Application August 17, 1953,
Serial No. 374,821

8 Claims. (Cl. 260—580)

The present invention is concerned with a novel method of converting halonitrobenzenes, notably chloronitrobenzenes, to their corresponding haloanilines by hydrogen reduction. More particularly, it is directed to methods of effecting such reduction with a minimum of dehalogenation.

It has been appreciated that nitrobenzenes may be converted to their corresponding anilines by hydrogen reduction, particularly in the presence of various catalytic agents such as iron filings and sulfuric acid, metallic nickel, etc. However, these processes are not entirely suitable for hydrogen reduction of halonitrobenzenes to haloanilines, mainly because considerable dehalogenation accompanies the reduction. Thus, treatment of halonitrobenzenes under the conditions employed for conversion of other nitrobenzenes has resulted in the preparation of sizeable quantities of anilines, often to the extent that little or no haloaniline can be detected in the reduction product.

According to the present invention, a novel process has been found whereby halonitrobenzenes and particularly chloronitrobenzenes may be reduced with hydrogen to their corresponding haloanilines without encountering simultaneous preparation of large quantities of the corresponding dehalogenated aniline. Under optimum conditions, it is possible to entirely avoid this undesirable dehalogenation. Further, the conversion may be accomplished in nearly quantitative yields, e. g. over 90 percent of the treated halonitrobenzene may be recovered as its corresponding haloaniline.

It has been discovered that conversion of halonitrobenzenes to their corresponding haloanilines can be achieved without encountering undue formation of dehalogenated anilines by performing the hydrogen reduction in the presence of catalytic quantities of finely divided particles containing metallic rhodium at temperatures between 25° C. and 180° C.

The rhodium catalyst required for satisfactory performance of the invention may be prepared in various ways in order that a large surface area of metallic rhodium per unit weight thereof is provided. A typical preparation includes depositing metallic rhodium, as by spraying, vapor deposition, cathode sputtering, precipitation of a salt followed by reduction or the like, on a finely divided inert inorganic carrier material such as activated alumina having a particle size of less than 200 mesh. Other inert inorganic materials include finely divided silicon dioxide, calcium silicate, sodium silicate, mixed silicates such as calcium-aluminum silicate, calcium-sodium silicate, etc., talc, calcium carbonate, clay, etc. Also metallic oxides of the various elements of groups II, III, IV, and V of the periodic table. Sufficient rhodium is deposited to provide a final rhodium coated alumina containing about 5 percent by weight of rhodium. However, considerable latitude in the rhodium content of the catalyst is permissible, contents from about 0.1 to 25 percent by weight of rhodium being included.

Reduction of a halonitrobenzene to its corresponding haloaniline, according to this invention, includes introducing elemental hydrogen, or equivalent source of hydrogen, into a reaction mixture containing the halonitrobenzene and a suitable quantity of the rhodium catalyst, e. g. 0.1 to 5.0 percent catalyst (including rhodium and inert carrier) by weight of the halonitrobenzene. Preferably, the reaction is performed in the liquid phase and to this end at temperatures and pressures which admit of a liquid phase. Additionally, it is advisable to provide a suitable solvent for the halonitrobenzene, such as benzene, in the reaction mixture.

It is further necessary to perform the reaction at temperatures which not only permit a liquid phase reaction, but which also favor most efficient conversions both with respect to rate of reaction, by-product formation and minimum dehalogenation. In this regard, temperatures from about 25° C. to 170° C. or 180° C. are operable, with 80–120° C. constituting the best range. At temperatures of above about 180° C. the desired conversion will take place, but the product is contaminated with by-products. For this reason a maximum temperature of below 180° C., e. g. 120° C., is usually preferred. Below 25° C., the reaction rate is such that prolonged reaction periods are necessary in order to obtain an economical degree of conversion.

If superatmospheric pressures are employed, they should be relatively low pressures, notably below about 200–250 pounds per square inch gauge. Best results have been obtained with pressures of between about 75 and 140 pounds per square inch gauge, and at temperatures of 80 to 120° C.

Contemplated solvents include those inert organic liquids in which both hydrogen and the halonitrobenzene are soluble. By inert is meant non-reactivity under the conditions at which the reduction is accomplished. Among those which may be employed are benzene, xylene, cyclohexane, Cellosolve, the haloaniline corresponding to the halonitrobenzene, and alcohols, notably aliphatic alcohols containing 1 to 10 carbon atoms including methanol, ethanol, isopropanol, n-butanol, n-hexanol, amyl alcohol, etc. Preferably, alcoholic media are employed when the halonitrobenzene has a halogen atom in the meta position.

Varying concentrations of solvent may be employed. For the most part, media which at the outset of the reaction period comprise from 10 to 90 percent solvent by weight of the solvent and halonitrobenzene are adequate. Even higher solvent concentrations are operable and may be used if commercially feasible.

One precaution which should be observed in establishing a reaction medium involves avoiding conditions which lead to the formation of a distinct aqueous phase in which the catalyst tends to accumulate. This contingency may be averted by the use of adequate solvent concentrations. For example, if the reaction medium contains at least about 10 percent of an alcoholic solvent (by weight of the solvent and halonitrobenzene comprising the initial mixture) no difficulty in this regard is encountered.

As little as about 0.1 percent catalyst (rhodium plus carrier) by weight of the halonitrobenzene is adequate to produce a catalytic effect. Usually, a catalyst concentration of from about 0.4 to 1.0 percent is optimum, although even higher concentrations are equally useful. In addition, the catalyst is recoverable and reusable, rendering the process suitable for operation under continuous conditions.

The following examples are illustrative of the manner in which this invention may be performed.

EXAMPLE I

A series of experiments were performed which demonstrate practice of the invention at atmospheric pressure. The apparatus comprised a vertical glass column 135 centimeters high and 20 millimeters in diameter except for its lowermost 15 centimeters where it was 28 millimeters in diameter. Throughout its length, the column was provided with a spirally wound resistance wire suitably connected to a source of electricity and control means which provided controlled heating of the column's contents. A sintered glass disc provided the lower limit of the operative portion of the column, while its lowermost portion was provided with a gas inlet means. A gas outlet was also provided at the upper end of the column and included a water cooled reflux condenser, a water trap and a sulfuric acid trap. Flow meters were provided in both the inlet and outlet means. The temperature within the column was determined by an iron-constantan thermocouple situated in a well in the column about 7 centimeters above the glass disc.

The column was filled through the top with 63 grams (0.4 mole) of metachloronitrobenzene, an equivalent amount by weight of the solvent listed in Table I and 1.08 grams of a rhodium catalyst (Baker No. 310). This catalyst consisted of 5% rhodium metal deposited on activated alumina of less than 200 mesh particle size.

After charging the column, the contents were heated to the appropriate temperature indicated in Table I, and gaseous hydrogen was passed through the column at the rate of approximately 250 cubic centimeters per minute until the desired quantity had been introduced. Unreacted hydrogen passed out of the system through the reflux condenser and water traps.

Thereafter, the liquid contents of the column were allowed to filter down through the sintered glass disc and out of the apparatus via the gas inlet means and appropriate manipulation of a stopcock. In those runs in which catalyst was reused, the catalyst was simply allowed to remain in the column.

Distillation removed the solvent from the withdrawn liquid, whereafter an aqueous sodium bicarbonate solution was added to the residue. This alkaline mixture was steam distilled, the distillate extracted with ether and the extract dried over anhydrous sodium sulfate. The product remaining after removing the ether under vacuum was then analyzed by an infra-red method.

The following table summarizes the experimental conditions and results:

*Table I*

| Expt. | Operation | | | | Products | | | |
|---|---|---|---|---|---|---|---|---|
| | Solvent | Weight Percent Catalyst | Percent Excess Hydrogen | Temp. (°C.) | Recov'd. Metachloronitrobenzene (Percent) | Yield Metachloroaniline Percent | Yield Aniline Percent | Residue [1] as Metachloronitrobenzene (percent) |
| 27 [2] | Ethanol | 0.8 | 250 | 56 | 50.0 | 21.8 | 0.5 | 25.3 |
| 28 [3] | n-Butanol | 0.8 | 250 | 113 | 36.2 | 49.0 | 0.0 | 3.8 |
| 30 [3] | do | 0.8 | 600 | 110 | 0.5 | 79.8 | 3.8 | 5.2 |
| 31 | metachloroaniline | 0.8 | 250 | 200 | 7.7 | 71.3 | 7.1 | 29.0 |
| 32 [3] | n-Hexanol | 0.8 | 250 | 149 | 0.4 | 75.0 | 3.1 | 17.8 |

[1] Residue from steam distillation.
[2] The same catalyst was used in Expt. 28, 30, and 31. In Expt. 32, a new portion of catalyst was used.
[3] A phase separator replaced the reflux condenser at the top of the reaction vessel.

EXAMPLE II

A series of experiments were performed demonstrating the operability of the invention at mild superatmospheric pressures.

The autoclave employed in these experiments was constructed of chrome-stainless steel and had a volume of 183 cubic centimeters. It was mounted such that it could be automatically rocked; heating was accomplished with an electrically heated jacket. The autoclave was equipped with a combination valve containing a pressure gauge, rupture disc and inlet connection. The latter was attached to a high pressure delivery constant pressure regulator which in turn was connected to a hydrogen reservoir, a nitrogen cylinder and a hydrogen cylinder via high pressure tubing and valves.

Procedurally, 63 grams of metachloronitrobenzene, 63 grams of ethanol and a sufficient quantity of the same catalyst used in Example I to establish the specific concentration listed in Table II were placed in the autoclave. The autoclave was then placed in the heating jacket and suitably connected to fittings and flushed first with nitrogen at 200 pounds per square inch and then with hydrogen. With no hydrogen pressure in the autoclave, the temperature was raised to the desired value. Hydrogen was admitted to the reservoir from the main supply cylinder, and hydrogen thereafter was admitted to the autoclave at the desired pressure by means of the constant pressure regulator. The autoclave was rocked and the reaction temperature carefully controlled to ±1° C.

After the reaction was over, the combination valve was closed, the pressure was released from the lines and the autoclave was removed from the heating jacket and cooled in a stream of air after venting residual hydrogen. When the autoclave had cooled to about 25° C., it was vented and opened; the liquid contents were removed by washing with ethanol while the catalyst was removed by suction filtration. The removed material was treated in the same manner as described in Example I. Table II summarizes the conditions and results of a series of runs performed in this manner:

Table II

| Expt. | Weight Percent Catalyst [5] | Temp. (°C.) | Total Press (p. s. i. g.) | Hydrogen Press (p. s. i. g.) | Reaction Time (Hr.) | Recov'd. Metachloronitrobenzene (Percent) | Yield Metachloroaniline (Percent) | Yield Aniline (Percent) | Residue Calc'd. as Metachloronitrobenzene (Percent) |
|---|---|---|---|---|---|---|---|---|---|
| 38 | 0.8 | 80 | 60 | 45 | 8.0 | 20.6 | 69.7 | 1.9 | 3.4 |
| 40 [1] | 0.8 | 100 | 80 | 45 | 5.5 | 0.9 | 89.9 | 1.3 | 2.6 |
| 41 | 0.6 | 100 | 80 | 45 | 15.5 | 2.7 | 92.3 | 1.3 | 1.0 |
| 42 [2] | 0.8 | 120 | 110 | 45 | 1.5 | 0.0 | 85.0 | 3.9 | 3.4 |
| 43 | 0.8 | 120 | 110 | 45 | 2.2 | 0.2 | 85.1 | 2.1 | 1.5 |
| 44 | 0.8 | 100 | 125 | 90 | 1.5 | 0.1 | 83.8 | 4.9 | 4.7 |
| 45 | 0.4 | 100 | 125 | 90 | 2.3 | 0.6 | 89.9 | 1.5 | 3.5 |
| 46 [3] | 0.8 | 100 | 80 | 45 | 3.0 | 0.0 | 88.8 | 1.5 | 0.3 |
| 47 [3] | 0.8 | 80 | 200 | 135 | 1.5 | 0.0 | 85.1 | 2.6 | 5.2 |
| 48 [4] | 0.4 | 100 | 125 | 90 | 6.0 | 0.0 | 91.5 | 2.0 | 1.5 |

[1] This catalyst was reused in Expt. 41.
[2] This catalyst was reused in Expt. 43.
[3] Absolute ethanol was used in this case.
[4] The reaction mixture was kept at the reaction conditions for at least an equal length of time as the reaction required for completion.
[5] Percent of catalysts by weight of the chloronitrobenzene.

Other halonitrobenzenes may be employed in lieu of metachloronitriobenzene in the processes described in the previous examples. Besides chloronitrobenzenes, corresponding bromo-, iodo-, and fluoro-nitro benzenes are intended along with polyhalonitrobenzenes and mixed polyhalonitrobenzenes, e. g. chlorofluoronitrobenzenes. Also halonitrobenzenes containing a plurality of NO₂ groups are included such as chlorodinitrobenzenes. Suitable halonitrobenzenes containing other substituents on their rings which are not reduced under reaction conditioners also are within the scope of this invention. Typically, these include halonitrobenzenes wherein the benzene ring contains alkyl groups such as methyl, ethyl, propyl, etc.

Although this invention has been described with reference to specific details of certain embodiments thereof, such details are not to be construed as limitations upon the invention except insofar as reacted in the appended claims.

I claim:
1. The method of preparing a metahaloaniline without simultaneously effecting substantial dehalogenation which comprises treating a metahalonitrobenzene with hydrogen in the presence of a catalytic quantity of finely divided particles containing metallic rhodium, said treatment being performed at a temperature of from 25° C. to 180° C.

2. A method of preparing a metahaloaniline without simultaneously encountering substantial dehalogenation which comprises introducing elemental hydrogen into a liquid medium containing a metahalonitrobenzene and a catalytic concentration of finely divided particles containing metallic rhodium while maintaining the liquid medium at a temperature of from 25° C. to 180° C.

3. A method of preparing a metahaloaniline without simultaneously encountering a substantial dehalogenation which comprises establishing a liquid medium containing metahalonitrobenzene, an inert organic solvent for the metahalonitrobenzene and a catalytic concentration of particles containing metallic rhodium, introducing hydrogen into the liquid medium, and maintaining the temperature between 25° C. and 180° C.

4. A method of preparing a metachloroaniline without simultaneously encountering substantial dechlorination which comprises treating a metachloronitrobenzene with hydrogen in the presence of a catalytic concentration of metallic rhodium at a temperature from 25° C. to 180° C.

5. A method of preparing methachloroaniline wihout simultaneously encountering substantial aniline formation which comprises treating metachloronitrobenzene with hydrogen in the presence of a catalytic concentration of metallic rhodium at a temperature of from 25° C. to 180° C.

6. A method of preparing metachloroaniline without simultaneously encountering substantial aniline formation which comprises introducing hydrogen into a liquid medium of metachloronitrobenzene and an inert organic solvent for said benzene and hydrogen, said medium containing a catalytic concentration of finely divided metallic rhodium particles while maintaining the temperature of the liquid medium between 25° C. and 180° C.

7. The method of claim 6 wherein the temperature is maintained between 80° C. and 120° C.

8. The method of claim 6 wherein the inert organic solvent is a monohydric aliphatic alcohol containing 1 to 10 carbon atoms, and in which the said alcoholic solvent comprises at least about 10 percent by weight of the liquid medium.

References Cited in the file of this patent
UNITED STATES PATENTS

| 1,530,392 | Morrell | Mar. 17, 1925 |
| 1,845,280 | Jaeger | Feb. 16, 1932 |
| 2,166,971 | Schmidt | July 25, 1939 |
| 2,259,423 | Kirkpatrick | Oct. 14, 1941 |
| 2,606,159 | Owen | Aug. 5, 1952 |
| 2,631,167 | Werner | Mar. 10, 1953 |